United States Patent
Gurbuz et al.

(10) Patent No.: US 10,455,618 B2
(45) Date of Patent: Oct. 22, 2019

(54) SYNCHRONIZED-CONTENTION WINDOW FULL-DUPLEX MAC PROTOCOL FOR ENABLING FULL-DUPLEX COMMUNICATION IN WIRELESS LOCAL AREA NETWORK

(71) Applicant: Sabanci Universitesi, Istanbul (TR)

(72) Inventors: Ozgur Gurbuz, Istanbul (TR); Deniz Marlali, Istanbul (TR)

(73) Assignee: Sabanci Universitesi, Istanbul (TR)

( * ) Notice: Subject to any disclaimer, the term of this patent is extended or adjusted under 35 U.S.C. 154(b) by 0 days.

(21) Appl. No.: 16/052,569

(22) Filed: Aug. 1, 2018

(65) Prior Publication Data

US 2018/0343104 A1 Nov. 29, 2018

Related U.S. Application Data

(63) Continuation of application No. PCT/TR2016/050027, filed on Feb. 4, 2016.

(51) Int. Cl.
| | |
|---|---|
| *H04L 5/14* | (2006.01) |
| *H04W 28/02* | (2009.01) |
| *H04W 48/10* | (2009.01) |
| *H04W 56/00* | (2009.01) |
| *H04W 74/08* | (2009.01) |
| *H04W 84/12* | (2009.01) |
| *H04W 84/20* | (2009.01) |

(52) U.S. Cl.
CPC ......... *H04W 74/0816* (2013.01); *H04L 5/14* (2013.01); *H04W 28/0247* (2013.01); *H04W 48/10* (2013.01); *H04W 56/001* (2013.01); *H04W 56/002* (2013.01); *H04W 74/0825* (2013.01); *H04W 84/12* (2013.01); *H04W 84/20* (2013.01)

(58) Field of Classification Search
CPC ............. H04L 5/14; H04W 28/02–26; H04W 48/02–20; H04W 56/0005–003; H04W 74/002–0891; H04W 84/02; H04W 84/12; H04W 84/18–22
See application file for complete search history.

(56) References Cited

U.S. PATENT DOCUMENTS

2015/0103767 A1 4/2015 Kim et al.

OTHER PUBLICATIONS

Sahai, A., Patel, G., Sabharwal, A., "Pushing the limits of Full-duplex: Design and Real-time Implementation," dated Jul. 4, 2011, pp. 1-13, arxiv.org, Cornell University Library, 201 Olin Library, Cornell University, Ithaca, NY 14853, XP080513504.

Duarte, M., Dick, C., Sabharwal, A., "Experiment-driven Characterization of Full-Duplex Wireless Systems," dated Jul. 7, 2011, pp. 1-33, IEEE Transactions on, 11(12):4296-4307, Dec. 2012), IEEE.

(Continued)

*Primary Examiner* — Timothy J Weidner
(74) *Attorney, Agent, or Firm* — Brinks Gilson & Lione (57) ABSTRACT

An S-CW FD system includes a method of operating a local area network accessible by a plurality of local area network communication nodes, each station including transceiver means adapted to operate on a wireless electromagnetic wave transmission channel. The system includes a synchronized contention window (S-CW) full duplex (FD) protocol enabling full duplex communication in wireless local area networks (WLAN) by means of a medium access control (MAC) protocol.

16 Claims, 5 Drawing Sheets

(56) References Cited

OTHER PUBLICATIONS

Choi, W., Lim, H., Sabharwal, A., "Power-Controlled Medium Access Control Protocol for Full-Duplex WiFi Networks," dated Jul. 7, 2015, pp. 1-14, IEEE Transactions on Wireless Communications, vol. 14, No. 7, IEEE.
International Search Report, dated Sep. 28, 2016, pp. 1-4, issued in PCT/TR2016/050027, European Patent Office, Rijswijk, The Netherlands.
International Preliminary Report on Patentability, dated Apr. 24, 2018, pp. 1-7, , issued in PCT/TR2016/050027, European Patent Office, Rijswijk, The Netherlands.

SYNCHRONIZED-CONTENTION WINDOW FULL-DUPLEX MAC PROTOCOL FOR ENABLING FULL-DUPLEX COMMUNICATION IN WIRELESS LOCAL AREA NETWORK

RELATED APPLICATIONS

The present patent document is a continuation of PCT Application Ser. No. PCT/TR2016/050027, filed Feb. 4, 2016, designating the United States and published in English, which is hereby incorporated by reference.

TECHNICAL FIELD

The present disclosure relates to a synchronized contention window (S-CM full duplex (FD) protocol system (S-CW FD system) enabling full duplex communication in wireless local area networks (ALAN) by means of a medium access control (MAC) protocol.

BACKGROUND

The challenge of improving the performance of wireless networks has always been intriguing for researchers. Enhancements in the physical layer aim to achieve data rates approaching channel capacity, and new medium access control (MAC) schemes provision high utilization and throughput, along with fairness or Quality of Service guarantees. However, only half of the physical bandwidth is available for one way wireless communication, since the channel needs to be partitioned for transmit and receive operations either in the frequency or time domain. This is because a wireless node cannot transmit and receive over the same frequency band at the same time; in other words, full-duplex (FD) communication is not possible.

SUMMARY

The reason FD has not yet been possible in wireless systems is the significant amount of self-interference: When transmitting and receiving simultaneously, a node captures the signal from its transmitter along with the signal it is attempting to receive; hence successful reception was not possible. To this end, several radio designs can be referred to with additional antennas and circuitry have been shown to cancel the self-interference (SI) and enable FD communication.

Most of the efforts on FD has concentrated on the physical layer, proposing and investigating techniques for SI cancellation, considering the effects of errors or residual SI after SI cancellation, or comparing the performance of FD systems with their half-duplex (HD) counterparts in terms of physical layer metrics, such as average achievable rates and outage capacity. In some of the prior art references, the residual SI is considered to be zero assuming ideal SI cancellation to quantify the upper bound of FD, while some of the references consider either a constant residual SI or a constant SI cancellation factor for reducing the transmitted signal power.

It is to be noted that none of these SI models are realistic, as shown by the extensive measurements on a real implementation by M. Duarte, C. Dick, and A. Sabharwal (Experiment-driven characterization of full-duplex wireless systems, Wireless Communications, IEEE Transactions on, 11(12):4296-4307, December 2012). In the study being referred to herein, an empirical model is devised, showing that the power of the residual SI, i.e., SI after cancellation, is actually related to the transmitted power, along with factors representing the effects of analog and digital cancellation. This model is not only mathematically tractable, but also the most realistic one, since unlike other models, the residual SI is not underestimated and it is modeled as a function of the transmit power. For analyzing the gain of FD over HD, the level of SI cancellation and residual SI model is of critical importance.

Therefore, despite the increasing interest in FD wireless, prior art literature on FD MAC protocols is still limited. Access mechanisms can be divided into two main sections, namely, random access and RTS/CTS handshaking. The basic FD operation is implemented in a bidirectional FD scenario, where two nodes can simultaneously communicate with each other by making use of the packet preambles for FD operation. The primary and secondary transmissions in similar prior art protocols, require a receiving node to capture the header correctly and analyze it while still receiving a data packet. In order to capture a header correctly, substantial modifications in IEEE 802.11 protocol is inevitable, which both makes the hardware and software implementation harder and restricts legacy support, which is essential to an FD protocol since updating a HD system entirely to FD on a sudden is costly.

According to the present disclosure, the legacy support is one of the most important features in contrary to FD literature, which generally proposes a shared random backoff procedure to coordinate the nodes in FD operation. Alternatively, a prior art access mechanism called semi-synchronous channel access is presented, which functions in the manner that before a transmission, a transmitting node sends a preamble to the receiving node. The receiving node acts according to status of the channel (busy or idle) and whether it has packets, and FD is enabled when applicable. It is to be noted that while this semi-synchronous channel access mechanism increases the overall throughput of the system, it does not support legacy 802.11 nodes.

There are also other prior art applications in the form of Carrier Sense Multiple Access with Collision Avoidance (CSMA/CA) based basic IEEE 802.11-like MAC protocols according to which different frame structures and protocol operations are employed for different cases depending on which node is initiating FD operation or whether it is a bidirectional transmission or FD relay. However, such protocol designs lack practicality, since it is quite difficult to decode packet headers and take actions accordingly while receiving a packet. This requires substantial changes in conventional MAC implementations.

The system and methods of the S-CW FD system described herein can be applied to different FD scenarios (bidirectional or relaying) via the same access mechanism, and it can work together with IEEE 802.11 legacy nodes. Hence, S-CW FD system is not only flexible, but also it can be easily implemented by making use of the off-the-shelf WLAN hardware and firmware.

Another prior art implementation among many other RTS/CTS based approaches could be referred to as a reservation (RTS/CTS) based approach, where the protocol uses a two way FCTS (FD clear to send) mechanism to start an FD transmission.

In the S-CW FD system, FD transmission is initiated with information embedded in the packet header, causing much smaller overhead than RTS/CTS exchange. RTS/CTS is no longer necessary for FD, since by nature FD solves the hidden terminal problem. Last but not least, though this advantage is mentioned in prior art implementations, their performance in the presence of hidden nodes is not evaluated. The S-CW FD system also takes into consideration the effect of hidden nodes in evaluating the performance of FD MAC, in addition to a realistic model of residual SI, which is a function of the transmitter power; while existing works assume ideal or constant SI cancellation.

It is also to be noted about full-duplex protocols that it can be made reference to the usage of busy tone signal in asymmetric traffic. Although using busy tone signals might help protocol organization, transmitting a busy tone increases energy consumption, which is important for wireless systems since they depend on a battery. Although many FD protocols are proposed, none of them are both easy to implement and resulting in high throughput values while being able to support legacy nodes at the same time. Even each FD protocol has similarities and differences in different parts with other FD protocols.

The S-CW FD system works in bi-directional scenarios where two nodes (two terminals in ad hoc mode or a terminal and the AP/base station in infrastructure mode) communicate simultaneously with each other, as well as in two hop scenarios, (1) relaying scenario where a node (or AP) relays data from a source node to another node, or (2) cellular/infrastructure scenario where AP communicates with one node in the uplink and a different node in the downlink, as long as the two end nodes (source and destination in (1) and the uplink and downlink in (2) node) do not hear each other. S-CW FD system and all other full-duplex MAC protocols mentioned above as prior work fail to work in two-hop scenarios (relaying or cellular/infrastructure mode) when the end nodes do hear each other. This is due to collision observed at the destination (or downlink) node, as the source (or the uplink node) and the relay (or AP) transmit simultaneously and the relay (or AP) can receive from the source (or uplink node) and transmit to the destination (downlink node) at the same time due to full-duplex operation. This problem can only be resolved by power control by which the transmission power of source (or uplink node) and relay (or AP) are adjusted to control the interference at the destination node (downlink node) so that collision does not occur. In a recent disclosure ("Power-controlled medium access control protocol for full-duplex Wi-Fi networks," Wireless Communications, IEEE Transactions on vol. 14, no. 7, pp. 3601-3613, July 2015), this problem is addressed by such a solution together with an enabling MAC. The disclosure has proposed an RTS/CTS based full-duplex MAC protocol named PoCMAC, where using the power levels in RTS and CTS packets, stations contend for receiving from AP. Also, by making use of the control packets in the handshake, Source-Destination, Source-Relay and Relay-Destination channels are estimated and optimal power levels are calculated via a heuristic algorithm trying to maximize the end to end throughput. nth such power assignment, the destination (or downlink terminal) does not observe collision, despite the source (or uplink terminal) and the relay (or AP) transmit at the same time, as the relay (or AP) operates in full-duplex mode receiving and transmitting simultaneously.

In the S-CW FD system, synchronized contention window full duplex protocol is therefore presented as a generic, easy to implement MAC protocol, which enables FD in WLANs, while supporting legacy HD IEEE 802.11 nodes, which is named as one of the challenges that FD MAC protocols face in the future.

A contention window synchronization mechanism is proposed to adjust the backoff slots of the communicating nodes in order to enable simultaneous transmissions.

Synchronized contention window full duplex protocol of the S-CW FD system doubles the throughput of HD WLANs, but this gain decreases with increasing number of nodes in the network. nth the introduction of hidden nodes, the gain of S-CW FD over HD WLANs increases drastically, up to an order of magnitude.

An interesting aspect of the S-CW FD system is that it provides a medium access control (MAC) protocol that enables FD operation in wireless local area networks (WLANs).

Another interesting aspect of the S-CW FD system is that it provides Synchronized Contention Window Full Duplex (S-CW FD) protocol as a modified form of IEEE 802.11 MAC with mechanisms to support the FD operation, so as to synchronize the involved nodes with minimal overhead.

Another interesting aspect of the S-CW FD system is that it improves the network throughput by using the S-CW FD protocol, by FD transmissions and by alleviation of the hidden terminal problem.

The present S-CW FD system proposes a synchronized contention window (S-CW) full duplex (FD) MAC as a protocol for enabling FD in WLANs for enhanced throughput. The main advantages of S-CW FD system is its simplicity, due to easy implementation on off-the-shelf 802.11 equipment, which can work in infrastructure and ad hoc mode, while supporting bidirectional and relaying FD transmissions and additionally it can work with legacy 802.11 nodes.

The S-CW FD system provides 1.5-2 times higher throughput in comparison to HD legacy WLANs, in the case there are no hidden nodes in the network.

The disclosure therefore relates to a method of and system to enable FD in WLANs for improving the performance of WLANs by using S-CW FD protocol of the S-CW FD system as a MAC scheme.

The S-CW FD system includes a method of operating a local area network is proposed wherein transmission of a first FD communication data packet from a first communication node to a second communication node is effectuated by selecting the second communication node from a backoff list of communication nodes using the minimum of the backoff slot times in said backoff list.

An entry for said second communication node the first communication node is transmitting with is updated in the backoff list with a randomly generated backoff slot time. The backoff window information in the form of said randomly generated backoff slot time is defined in the first FD communication data packet. FD communication between said first communication node and said second communication node is started in the manner that both communication nodes back off with the minimum of the backoff slot times associated with said second communication node in said backoff list.

BRIEF DESCRIPTION OF THE DRAWINGS

Accompanying drawings are given solely for the purpose of exemplifying a system and method by which an S-CW FD MAC protocol of the S-CW FD system enables FD in WLANs, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure herein.

DETAILED DESCRIPTION

The present disclosure proposes a S-CW FD system that uses a medium access control (MAC) protocol, named Synchronized Contention Window Full Duplex (S-CW FD) protocol for enabling full duplex in wireless local area networks (WLANs).

The proposed S-CW FD protocol works in ad hoc and infrastructure modes of IEEE 802.11 WLANs, as well as with legacy nodes.

The design of the S-CW FD protocol is based on classical IEEE 802.11 MAC with additional features, such as back-off synchronization and master-slave roles, as well as modifications to enable and maintain FD communications.

The present S-CW FD system is devised under the recognition that a scheme of shared random backoff procedure to coordinate the nodes in FD operation might face performance problems in a heavily loaded network, since it is highly likely that a node with a lower backoff than the shared backoff can seize the channel from the FD nodes. The S-CW FD system affords solution of this problem in the manner that each FD node stores the remaining backoff slots with the other FD nodes. Even when another node obtains the medium, the backoff slots for link between the two FD nodes are frozen at the same level, so that they have a high chance of gaining access for FD operation without HD transmission in the next contention period, as will be delineated in detail hereinafter.

In the S-CW FD system, the packet fields for FD operation are processed after the packet is received completely. Likewise, FD transmission is initiated with information embedded in the packet header, causing much smaller overhead than RTS/CTS exchange. These and other technical advantages will be apparent to the skilled worker based on the following detailed description.

An infrastructure based WLAN can be defined to have nodes, which include one or more access points (AP) and any number of stations in a cell. An access point (AP) or node may be one or more networking hardware device(s) providing connection, such as via a router, to wired network(s) for one or more devices, such as stations, capable of wireless communication with the AP. A station may be any device capable of wireless communication using a wireless communication protocol. The nodes (AP and the stations) being assumed to be FD capable, with FD radios, the proposed S-CW FD protocol of the S-CW FD system is functional in both ad hoc and infrastructure modes, and also for both bidirectional and relaying FD modes.

The design of the synchronized contention window full duplex protocol is based on classical IEEE 802.11 MAC with additional features in the form of backoff synchronization and master-slave roles and modifications to enable and maintain FD communications. Being based on IEEE 802.11 allows the S-CW FD protocol to remain compatible with the legacy nodes in HD mode, also facilitating heterogeneous scenarios involving both HD and FD nodes and transmissions.

In the synchronized contention window full duplex protocol of the S-CW FD system, two FD nodes being synchronized, they can transmit simultaneously. This is achieved by sharing the size of the next backoff window (the number of backoff slots) between the FD nodes. In order to start an FD transmission in the S-CW FD system, initially a successful HD transmission is required, which three new control fields being exchanged as identified below.

FD is a one bit field indicating that FD mode is on (which is indicated by a 1), so that the receiving node is able to prepare itself for FD operation and obtains the other two control fields, fd_master and next_bo, which are used to achieve synchronization. The next_bo field carries the randomly selected number of backoff slots of the sending node for the next contention period, and fd_master is another one bit field informing of the role of the receiving node, where a 1 indicates the master and a 0 indicates the slave. These control fields are continuously exchanged via packets sent in FD mode to continue and maintain FD mode, or in HD mode to start FD with another node, or to switch to HD mode when desired.

Figure 1:
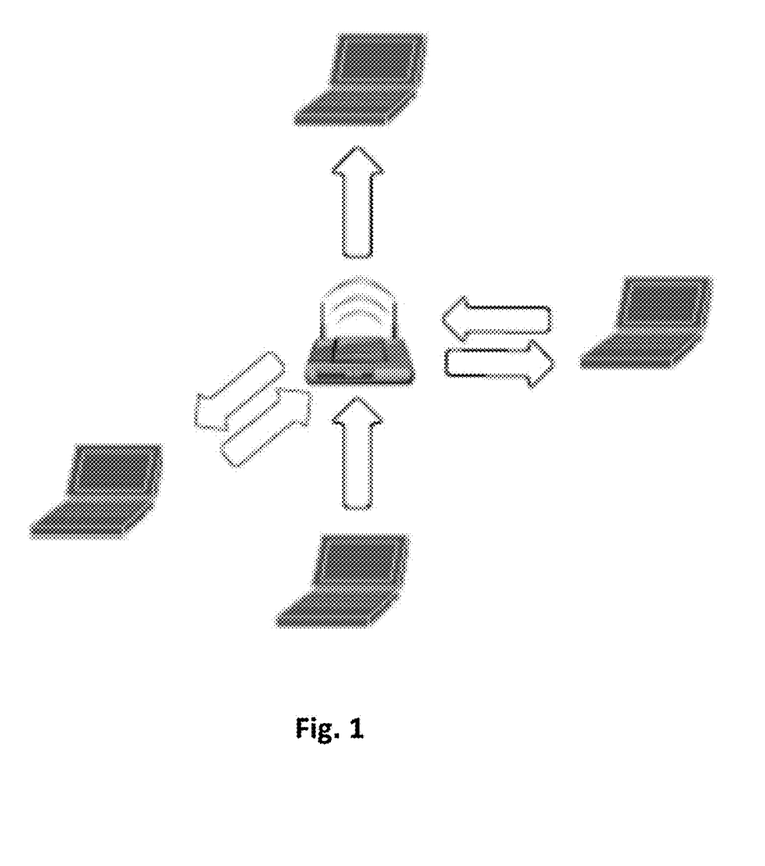
FIG. 1 demonstrates a schematic view of an example system model.
Figure 2:
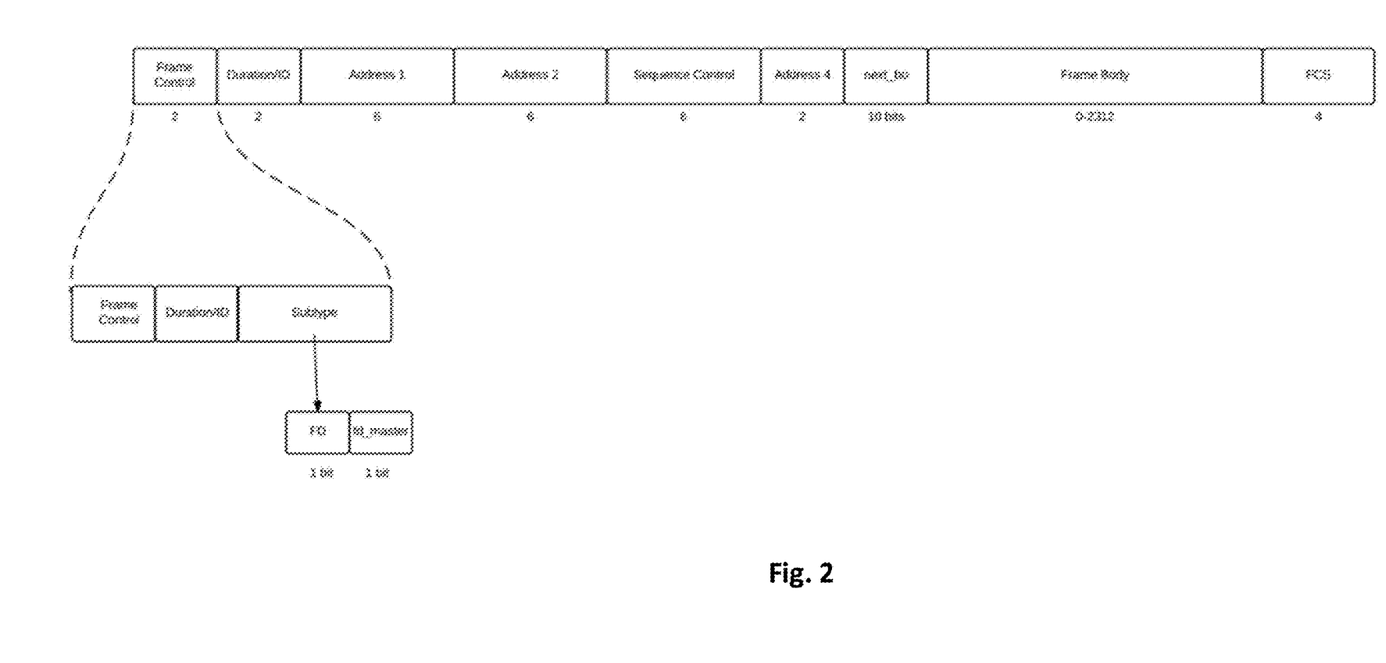
FIG. 2 demonstrates a schematic view of an example packet format.

Utilizing the IEEE 802.11 frame structure, for these control bits, the S-CW FD system makes use of two bits from the reserved bits under the subtype field of the Frame Control field in the MAC header for FD and fd_master fields. For the next_bo field, at least 10 bits is needed. To this end, a small overhead is introduced per packet in the payload (FIG. 2).

Therefore, the S-CW FD system defines the control fields of synchronized contention window full duplex protocol and they are set at the nodes as explained hereinafter: A node (station or access point (AP)) that decides to start FD operation can set the FD field. Also, a station sets the next_bo field in its packet to its single backoff window variable for transmitting to the AP, while the AP has a separate backoff window value for each station that it is communicating with. In order to coordinate FD transmissions of itself, the AP holds a list of backoff windows for all of the nodes in its coverage area. The coverage area of the AP represents a geographic area in which radio signals from the AP can be wirelessly received by devices, such as the stations. Hence, as the backoff period, the AP uses the minimum of the backoff windows in its list, updates the entry for the node it is transmitting with in its backoff list with a new randomly generated backoff slot number, once the backoff is completed, and sets the next_bo field in its packet to this value, thus it can start FD communication with the corresponding node, which backs off with the same amount of slots. It is to be made clear that using this backoff slot list at the AP, even if there is a collision or another node contending for the medium at some point, it is ensured that FD operation can continue without preceding HD transmissions.

Since both AP and the stations can generate and send the next_bo information, a mechanism to determine which next_bo will be used for an FD pair is required. For this purpose, fd_master field is defined in order to identify the master node as the node which dictates the backoff window. Conversely, the slave node is the node which uses the backoff slot it received from the master. Each node is a master by default, i.e., fd_master field in its packet is set to 0 in order to dictate the receiving node to be the slave, and in practice, the node that is able to transmit earlier becomes the master. Hence, the slave node uses the backoff window information it receives from the next_bo field. While one variable for defining the master-slave status is sufficient for the stations, the AP needs to keep a list for its master-slave status for its FD communication with each station similar to the backoff windows list. This is because, the AP can serve as a master for one station and a slave for another simultaneously. The pseudo-code for how AP decides which station to transmit can be found in Algorithm 1.

---
Algorithm 1 Select STA to Transmit
---
Require: L → List of stations visible to this.STA
min = 0for all STA in L do
    if STA.bkoff < L[min].bkoff then
        min = STA.index
    end if
    return L[min]
---

Figure 3:
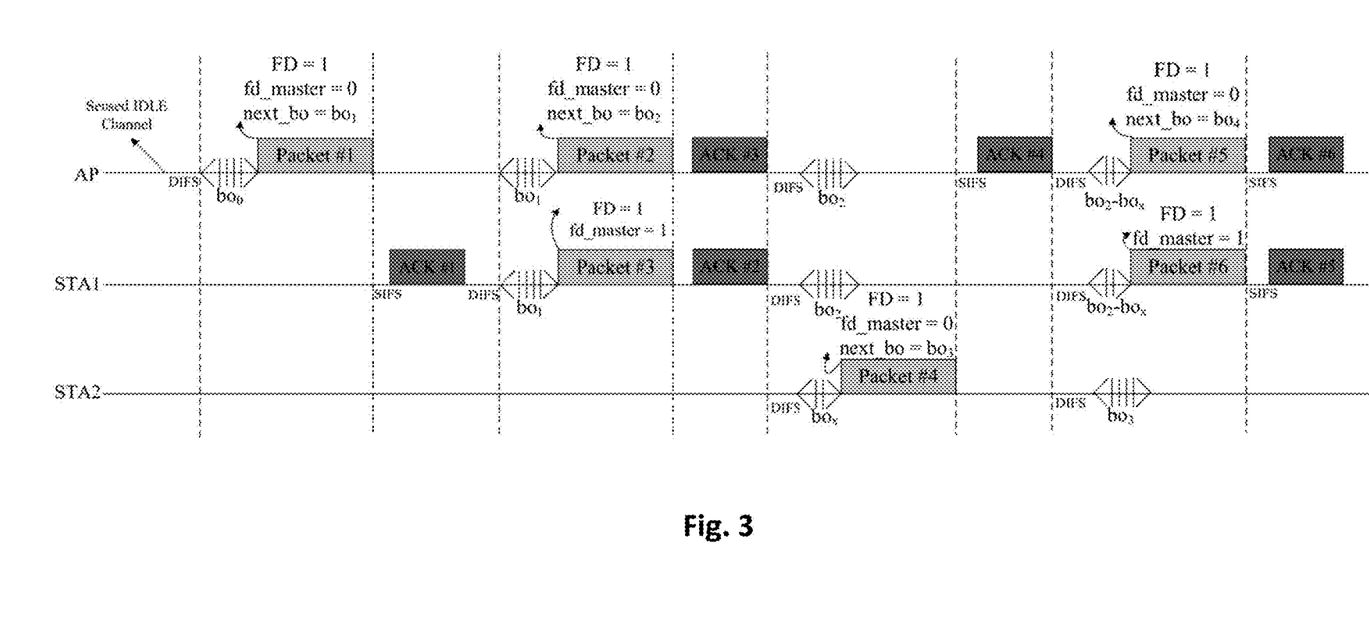
FIG. 3 demonstrates a view of an example packet sequence for the S-CW FD system.
Figure 4:
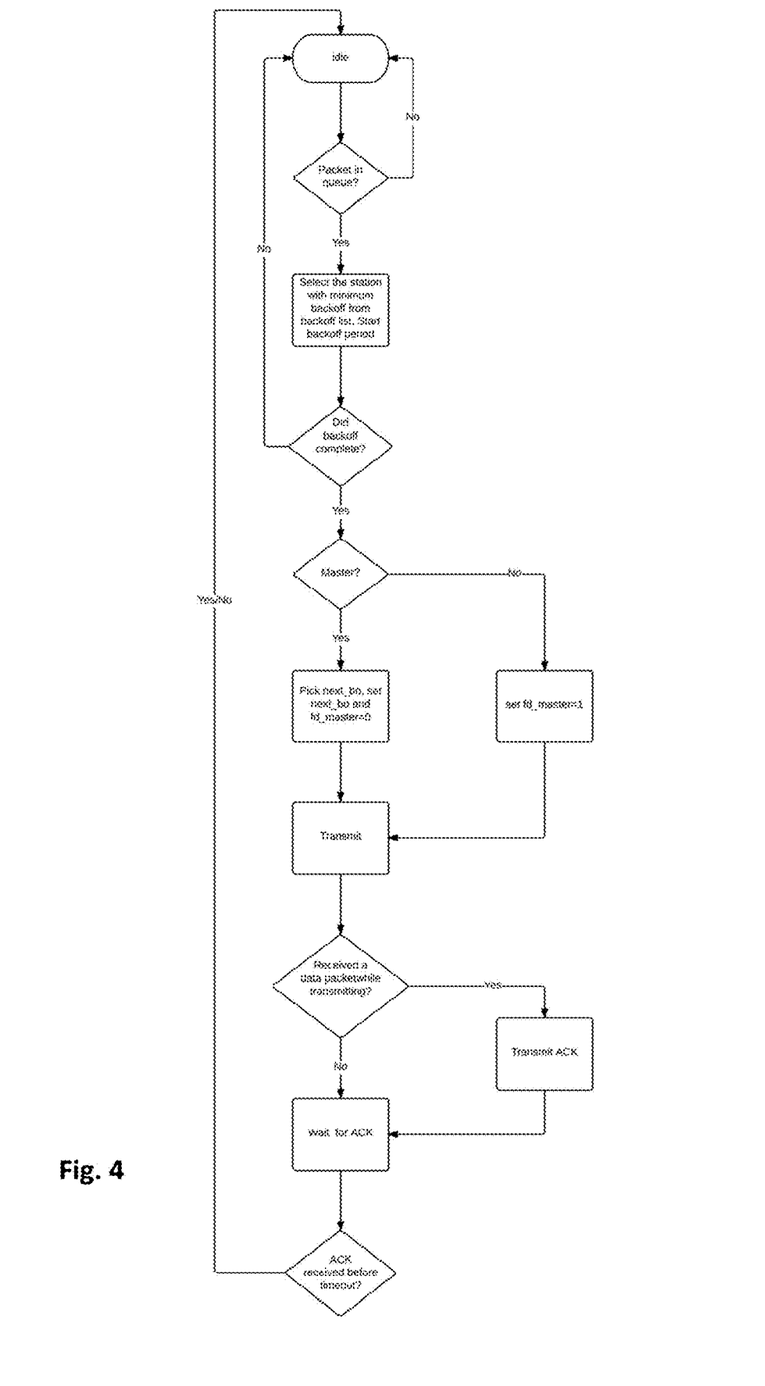
FIG. 4 demonstrates a diagram of an example state machine for AP in the S-CW FD system.
Figure 5:
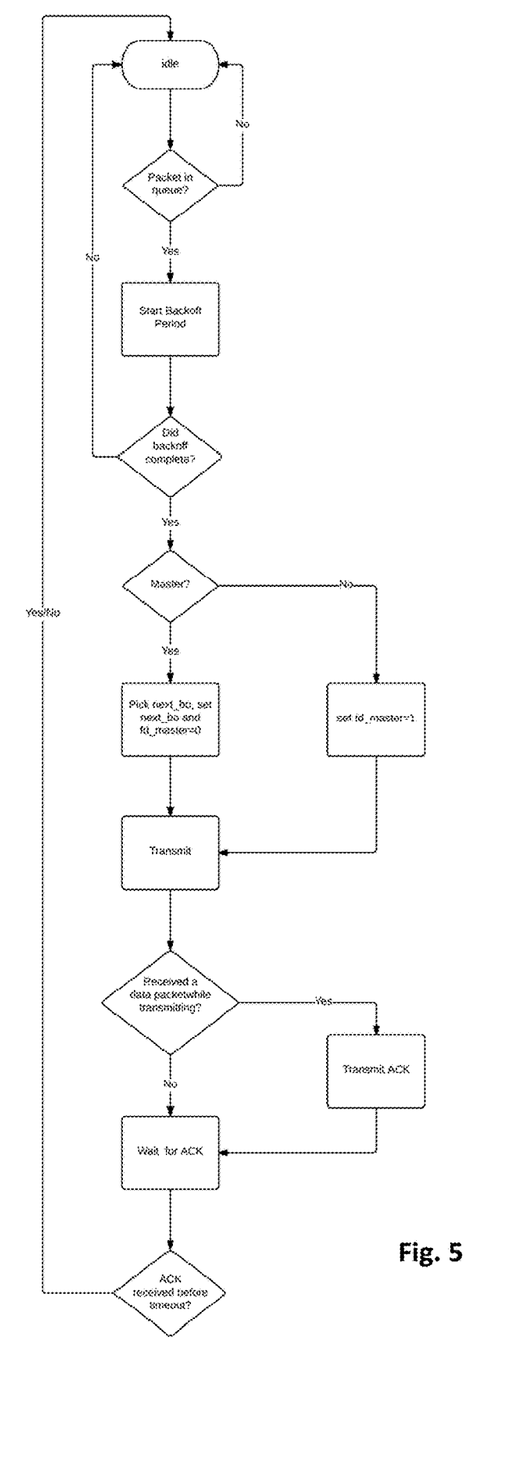
FIG. 5 demonstrates a flow diagram of an example station's operation in the S-CW FD system.

The working principle of the synchronized contention window full duplex protocol according to the S-CW FD system will now be described in reference to a practical example. Reference is made to FIG. 3 demonstrating an example packet sequence. Assuming that the AP has initiated transmission, the AP first detects that the channel is idle. After ensuring it stays idle for distributed coordination function (DCF) Interframe Spacing (DIFS) seconds, the AP backs off for a random number of slots before sending the first packet (Packet #1) in HD mode. In the MAC header of this packet, FD field is set to 1, fd_master field is set to 0, and the next_bo field is set to a value such as for instance bo1, which is the new random number of slots for the next backoff. Upon receiving this packet and reading the FD, next_bo and fd_master fields, the destination station, say STA1 as shown in the FIG. 3, discerns that it can work in FD mode, enables FD mode, marks itself as the slave and sets its next number of backoff slots to bo1 as it transmits an ACK after the SIFS period. In the next contention, after deferring for DIFS seconds and backing off for bo1 slots, both AP and STA1 start their transmission at the same time, sending packets #2 and #3, respectively, as shown in the FIG. 3. In these packets, fields of the S-CW FD system (S-CW FD fields) are again set, so that the AP is again the master that dictates the backoff window for the next transmission, setting the next_bo field as bo2. After the data packets are both received successfully, both AP and STA1 wait for the SIFS period and they transmit their ACKs in FD mode.

At this point, also in reference to the example of FIG. 3, another station, STA2 contends for the medium and wins it after box slots, which is smaller than bo2. Given the opportunity, STA2 transmits to the AP in HD, willing to perform FD communication with its own settings for S-CW FD fields. Assuming fd_master field set is to 0 and next_bo field set to bo3, receiving this packet, the AP updates its backoff window for STA2 as bo3, marks itself as the slave to this station and sends the ACK to STA2. After this point, the station with the lowest backoff will seize the channel, and recalling that the earlier backoff window (bo2) has been frozen due to STA2's transmission, if (bo2—box) is smaller than bo3, then the AP and STA1 will transmit to each other in FD mode, since both are already synchronized; otherwise, if bo3 is smaller than (bo2—box), then the AP will perform FD transmission with STA2. FIG. 3 shows the former case, where again in the FD packets the parameters for the next backoff window are being exchanged.

As it is known to the skilled worker, in regular IEEE 802.11 DCF (Distributed Coordination Function), a node waits for the EIFS period after the medium is free if it was not able to receive the last transmitted packet (the last packet is unsuccessful). Since in FD, two nodes transmit their packets concurrently, another node which hears the medium would not be able to receive both of the packets. According to the protocol of the S-CW FD system, if the third node hears that both of the transmissions start at the same time, it interprets this transmission as FD, and defer for the DIFS period instead of extended interframe space (EIFS). This modification should be done on the legacy HD nodes as well since otherwise the system would be unfair for the legacy nodes. The only time that the nodes need to use EIFS is, if there are more than two transmissions, or if the transmissions started at different times due to the exposed terminal problem.

It is worthwhile to note that, in case of a packet failure, due to collision(s) or channel errors, the nodes currently operating in FD mode will not be able to continue, since they will not be able to synchronize their backoff slots for their next transmission. In that case, both nodes will resort to HD mode, they will retransmit their packets and initiate FD mode again. Not being able to decode FD specific information (in preamble, specific packet fields or RTS/CTS packets), the synchronized contention window full duplex protocol in the S-CW FD system may resort to HD mode similar to prior art applications.

Last but not least, synchronized contention window full duplex MAC protocol operation, which is explained herein for an infrastructure scenario considering bidirectional FD between the stations and the AP is also functional for ad hoc mode bidirectional communication. In that case, the nodes need to store the master-slave and next backoff window information of all other nodes, as the AP does in the infrastructure mode. Also, synchronized contention window full duplex protocol can be successfully carried out for a three node (including relaying) scenario, where the AP is transmitting (or relaying) data to a station, while receiving from another station, as long as the two end stations do not hear each other. In case they do hear each other, power control can be conventionally performed.

It is to be noted that the performance of the synchronized contention window full duplex protocol of the S-CW FD system is evaluated under realistic self-interference (SI) and network models with hidden nodes via simulations considering networks of different sizes and various hidden node scenarios and the throughput gain of the S-CW FD system over standard HD 802.11 is quantified for the variety of scenarios.

In sum, a method of operating a local area network accessible by a plurality of local area network stations is proposed, each station including transceiver means adapted to operate on a wireless electromagnetic wave transmission channel, is adapted to be resynchronized in response to the transmission of a data frame In a nutshell, the S-CW FD system includes a method of operating a local area network accessible by a plurality of local area network communication nodes, each station including transceiver means adapted to operate on a wireless electromagnetic wave transmission channel, said method comprising the steps of: a) transmission of a first communication data packet from a first communication node to a second communication node by selecting the second communication node from a backoff list of communication nodes using the minimum of the backoff slot times in said backoff list, b) updating of the entry for said second communication node the first communication node is transmitting with in the backoff list with a randomly generated backoff slot time, c) transmission of said first communication data packet to said second communication node comprising the substep of defining the backoff window information in the form of said randomly generated backoff slot time in the first communication data packet and d) starting of communication between said first communication node and said second communication node, both communication nodes backing off with the minimum of the backoff slot times associated with said second communication node in said backoff list.

In one embodiment, said substep of defining the backoff window information comprises the step of setting a backoff slot time field in said first communication data packet to the value of said randomly generated backoff slot time.

In a further embodiment, said step of starting of communication between said first communication node and said second communication node comprises the substep that the backoff slot time generated by said first communication node is stored by said second communication node.

In a further embodiment, said first communication node sets an FD field in a data packet, said FD field indicating that FD mode is on so that the second communication node is informed and the first and second communication nodes initiate FD communication with each other.

In a further embodiment, the FD field is a one bit field where one indicates that FD mode is on.

In a further embodiment, said first communication node sets an FD master and slave field in a data packet, said FD master and slave field informing role of a receiving communication node.

In a further embodiment, said FD master and slave field indicating whether the first or the second communication node determines the backoff slot time.

In a further embodiment, the master and slave field is a one bit field where one indicates the master and zero indicates the slave.

In a further embodiment, a slave communication node uses the backoff slot time it receives from a master communication node.

In a further embodiment, the master and slave field is set to 0 by default and the receiving communication node is set to be the slave communication node.

In a further embodiment, each communication node keeps a list for its master-slave status for its FD communication with other communication nodes.

In a further embodiment, said second communication node enables FD mode and marks itself as the slave communication node in a second communication data packet, backing off for the minimum of the backoff slot times in said backoff list, said second communication data packet being sent in a synchronized manner with said first communication data packet.

In a further embodiment, if a third communication node starts transmitting a data packet after said first and second communication data packets are sent with a backoff slot time smaller than the randomly generated backoff slot time, the first and second communication nodes store the remaining backoff slot time of the randomly generated backoff slot time at the time when transmission of the data packet of said third communication node is initiated.

In a further embodiment, counting of the backoff slot times of the first and second communication nodes are frozen at the same time.

In a further embodiment, the control fields of FD field and FD master and slave field are continuously exchanged via data packets sent in FD mode to maintain FD mode, in HD mode to start FD with another communication node or to switch from FD to HD mode.

In a further embodiment, two bits from the reserved bits under the subtype field of Frame Control field in MAC header are used as the control bits of FD field and FD master and slave field.

In a further embodiment, if a third communication node hears that transmissions of the first and second communication data packets start at the same time, it interprets this transmission as an FD transmission and defer for DIFS period instead of EIFS.

In a further embodiment, in case of a packet failure due to collision or channel error, first and second communication nodes resort to HD mode, retransmit data packets and reinitiate FD mode.

In a further embodiment, each communication node stores next backoff slot time information being associated with a certain communication node.

The methods, devices, processing, circuitry, and logic of the S-CW FD system described herein may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method comprising:
   transmitting, over a local area network accessible by a plurality of local area network communication nodes, a first communication data packet from a first communication node to a second communication node by selecting the second communication node from a backoff list using a minimum of backoff slot times in said backoff list, wherein the local area network includes an access point (AP) and a plurality of stations, each communication node including transceiver means adapted to operate in full-duplex on a wireless electromagnetic wave transmission channel, and wherein the backoff list comprises a list of backoff slot times for all communication nodes in a coverage area of the access point,
   updating an entry for said second communication node in the backoff list with a value of a randomly generated backoff slot time,
   wherein transmitting said first communication data packet to said second communication node comprises the substeps of setting a backoff slot time field in said first communication data packet to the value of said randomly generated backoff slot time,
   setting a full duplex (FD) field in the first communication data packet, said FD field indicating that full-duplex FD mode is on,
   setting an FD master and slave field in said first communication data packet, said FD master and slave field informing of a role of a receiving communication node,
   starting a full-duplex communication between said first communication node and said second communication node, both the first and second communication nodes backing off with the minimum of the backoff slot times associated with said second communication node in said backoff list.

2. The method of claim 1, wherein said step of starting of communication between said first communication node and said second communication node comprises the substep of storing, by said second communication node, the backoff slot time generated by said first communication node.

3. The method of claim 1, wherein the FD field is a one bit field where a value of one indicates that FD mode is on.

4. The method of claim 1, wherein said FD master and slave field indicates whether the first or the second communication node determines the backoff slot time.

5. The method of claim 1, wherein the master and slave field is a one bit field where a value of one indicates the master and a value of zero indicates the slave.

6. The method of claim 5, wherein a slave communication node uses the backoff slot time it receives from a master communication node.

7. The method of claim 6, wherein the master and slave field is set to a value of zero by default and the receiving communication node is set to be the slave communication node.

8. The method of claim 5, wherein each communication node keeps a list for its master-slave status for its FD communication with other communication nodes.

9. The method of claim 1, wherein said second communication node enables FD mode and marks itself as the slave communication node in the second communication data packet, backing off for the minimum of the backoff slot times in said backoff list, said second communication data packet being sent in a synchronized manner with said first communication data packet.

10. The method of claim 9, wherein if a third communication node starts transmitting a data packet after said first and second communication data packets are sent with a backoff slot time smaller than the randomly generated backoff slot time, the first and second communication nodes store a remaining backoff slot time of the randomly generated backoff slot time at a time when transmission of the data packet of said third communication node is initiated.

11. The method of claim 10, wherein counting of the backoff slot times of the first and second communication nodes are frozen at a same time.

12. The method of claim 9, wherein if a third communication node hears that transmissions of the first and second communication data packets start at a same time, it interprets this transmission as an FD transmission and defers for a distributed coordination function (DCF) Interframe Spacing (DIFS) period instead of an extended interframe space (EIFS).

13. The method of claim 9, where in case of a packet failure due to collision or channel error, first and second communication nodes resort to HD mode, retransmit data packets and reinitiate FD mode.

14. The method of claim 9, wherein each communication node stores next backoff slot time information in association with a certain communication node.

15. The method of claim 1, wherein the control fields of FD field and FD master and slave field are continuously exchanged via data packets sent in FD mode to maintain FD mode, in HD mode to start FD with another communication node or to switch from FD to HD mode.

16. The method of claim 15, wherein two bits from reserved bits under a subtype field of a Frame Control field in a MAC header are used as control bits of the FD field and the FD master and slave field.

* * * * *